No. 777,105. PATENTED DEC. 13, 1904.
A. KAPTEYN.
FLUID PRESSURE BRAKE.
APPLICATION FILED FEB. 18, 1903.
NO MODEL.

WITNESSES
Jas. B. MacDonald.
J.␣Custer

INVENTOR,
Albert Kapteyn
By E. Wright
Att'y.

No. 777,105. Patented December 13, 1904.

UNITED STATES PATENT OFFICE.

ALBERT KAPTEYN, OF LONDON, ENGLAND, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

SPECIFICATION forming part of Letters Patent No. 777,105, dated December 13, 1904.

Application filed February 18, 1903. Serial No. 143,953. (No model.)

*To all whom it may concern:*

Be it known that I, ALBERT KAPTEYN, a subject of the Queen of the Netherlands, residing at London, England, have invented a certain new and useful Improvement in Fluid-Pressure Brakes, of which improvement the following is a specification.

This invention relates to fluid-pressure brake apparatus for railway and like vehicles, and especially to that type of apparatus in which the pressure of the brake-shoes on the wheels is controlled by the speed of the vehicle.

It is well known that the coefficient of friction between the brake-shoes and wheels of a vehicle varies in accordance with the speed of the vehicle. Hence it is necessary in order to secure an adequate braking effect that with an increased speed of the vehicle the brakes should be applied with a corresponding increase of pressure. It is also well known that at every speed there is a certain pressure on the brake-shoes which will just suffice to lock them with the wheel, and thereby skid the wheel on the rail, and it is exceedingly important in brake apparatus to so adjust the various parts as not to allow the pressure of the brake-shoes on the wheels to become so great as will allow this to take place. The reason for this is that when the wheel skids on the rail the braking effect is greatly reduced and also when this is allowed to happen flats are produced on the wheel, which is thereby rendered unfit for service.

It has heretofore been proposed to use a centrifugal governor for varying the force with which an escape-valve is held to its seat; but in this case the degree of brake-cylinder pressure at which the valve opens varies according to the centrifugal force of the governor and not in accordance with the speed of the car, since the centrifugal force varies as the squares of the corresponding speeds.

Various experiments which have been made seem to indicate that in order to obtain the highest possible brake efficiency the pressure in the brake-cylinder should not vary according to the square of the speed, but more nearly directly as the speed or according to some rule or law which may be determined by further experiment.

The object of this invention is to indicate means by which the maximum degree of pressure in the brake-cylinder can be made to vary automatically in accordance with the speed or with any law which may be found to give the highest possible brake efficiency.

Figure 1:
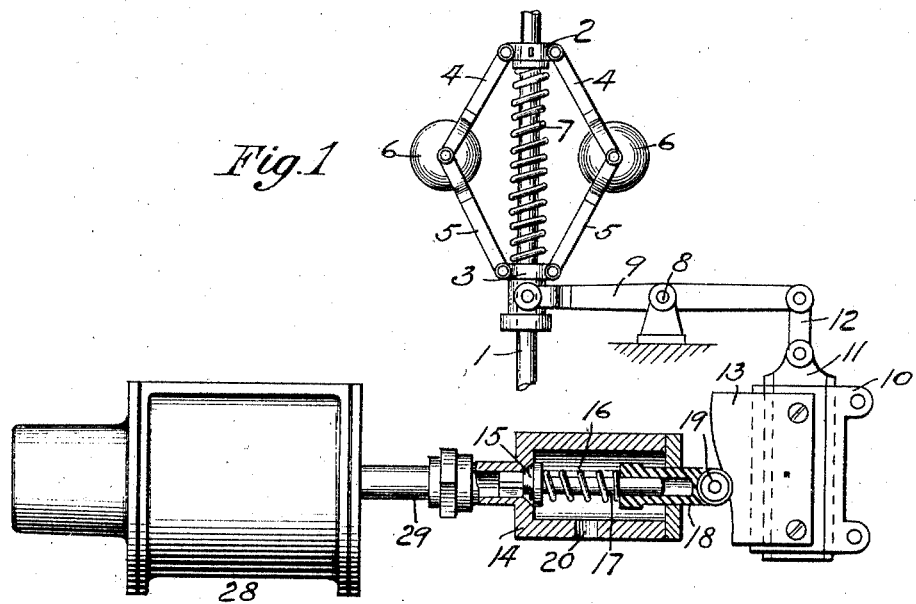
Figure 2:
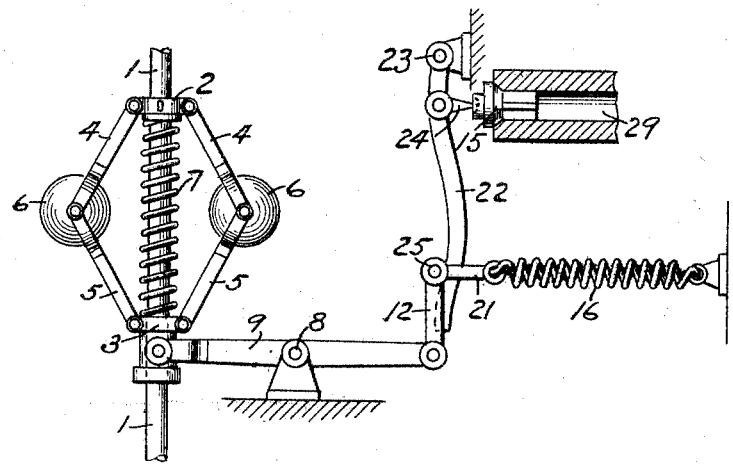

In the accompanying drawings, Figure 1 is a view showing diagrammatically one form of my improvement, and Fig. 2 is a similar diagrammatic view showing a modification.

The invention is applicable to any form of fluid-pressure brake apparatus, and as these are now well known it is not necessary to describe them in detail. Brake apparatus of this character comprises, essentially, a brake-cylinder provided with a piston, the rod of which is attached to the levers or other mechanism for applying the brakes, and the brakes are applied by admitting fluid under pressure to the brake-cylinder, thereby actuating its piston and applying the brake-shoes to the wheels.

Referring now to Fig. 1, a shaft 1 is mounted in suitable bearings fixed to any convenient part of the vehicle and is adapted to be rotated from a revolving part of the vehicle, such as the wheels or the axle, by any suitable means—such, for instance, as toothed gearing or a belt and pulley, a friction-disk, or the like. The shaft 1 is provided with a fixed collar 2 and a movable collar 3, these being pivotally connected together by double links 4 5. These links are provided at their central pivotal points with weights 6, and the collars 2 3 are arranged to be pressed apart by means of a spring 7, inserted between them and surrounding the shaft 1. The apparatus thus far described is a centrifugal governing device of a well-known character; but I wish it to be understood that the invention is not limited to this or any other form of governing device, as any suitable type of governor may obviously be employed. Pivotally attached to the lower collar 3 is a lever 9, mounted at its central point 8 in a bearing secured to the vehicle, and is so arranged as to respond to every variation in the movement of the collar 3. Also attached to the vehicle is a guide-bracket 10, in which is adapted to move a sliding plate 11, pivotally attached to its upper end by means of a link 12 to the other end of the lever 9. Firmly secured to this sliding plate 11 is another plate 13, which projects beyond the guide-bracket 10 and is curved at its outer end, thus providing a cam-surface for a purpose which will hereinafter appear. Connected to a convenient part of the brake-cylinder 28 and communicating with the interior thereof by a pipe 29 is a casing 14, provided with an exhaust-valve 15, said valve being held against its seat by means of a load device, such as spring 16. This spring surrounds the stem 17 of the valve 15 and abuts against a plunger 18, which is arranged to slide in an orifice in the other end of the casing 14. The end of the plunger 18 which projects through the casing 14 is provided with a wheel or pulley 19, adapted to engage with the curved portion of the plate 13. The casing 14 is also provided with an orifice 20, leading to the atmosphere, so that when the valve 15 is lifted from its seat fluid under pressure from the brake-cylinder may exhaust to the atmosphere.

The operation of the device is as follows: It will be clear that the governor will take up a definite position of equilibrium for every speed at which it revolves, this speed of course corresponding to the speed at which the vehicle is traveling. These various positions are communicated by means of the lever 9 and link 12 to the curved plate 13, which will consequently also take up a definite position corresponding to every variation in the speed of the vehicle. As the curved plate 13 is moved the sliding plunger 18 will be correspondingly moved, thereby altering the tension of the spring 16, and consequently the load on the valve 15. It is clear that the curve of the plate 13 may be made in such a way as to accurately express the law of greatest brake efficiency, and the shape of the curve or cam surface may be determined, if necessary, by practical experiment.

It will be obvious from the above that the load on the valve 15 will vary in accordance with the speed of the vehicle. Consequently should a higher pressure exist in the brake-cylinder than will suffice to obtain the maximum braking effect the excess of pressure will escape from the brake-cylinder through the exhaust-valve 15 and orifice 20 to the atmosphere and locking of the wheels by the brake-shoes being applied with too great force and consequent skidding of the wheels on the rails will be prevented. The pressure of the spring 16 on the valve 15 and the amount of variation in the load on the spring by means of the plunger 18 and curved plate 13 will be so adjusted as to secure this result, if necessary, by a process of trial and error.

In Fig. 2 of the drawings I have shown an example of how the device may be modified. In this case the lever 9 carries a link 12, which is attached to a roller 25, mounted at the end of the link 21, and to this link is attached the spring 16, which is secured at its other end to some fixed portion of the vehicle. In place of the sliding plate 13 the cam-surface is secured by means of a curved lever 22, which is pivotally attached at one end, 23, to a fixed part of the vehicle and is adapted to bear at its other end against the roller 25. The exhaust-valve 15 is held against its seat by means of a pointed arm 24, pivotally attached to the curved lever 22. The curve of the lever 22 may be determined in the same way as the curve of the plate 13—that is to say, by practical experiment. In this form of the device it will be seen that as the link 12 moves up and down in accordance with the movement of the lever 9, due to the varying position of the governor, the tension of the spring 16, as well as its leverage, will be altered, and conseqently the load on the valve 15 will vary in accordance with the various positions of the governor. In all other respects the operation of the device is similar to that described in Fig. 1.

It will now be seen that I have provided an intermediate element or connection, such as a cam-surface, between the centrifugal governor or other speed-controlled device and the load device acting on the valve, and also that such cam-surface may be varied so as to give any desired relation between the centrifugal force or speed and force acting on the valve, whereby the pressure of the brake-shoes may be automatically varied in accordance with the speed or with any law governed by the speed, as may be desired.

I wish it to be clearly understood that the constructions described above are only shown by way of example, and I do not limit myself to any particular construction, as many may be devised which will achieve the same object, and all are intended to be included within the scope of my invention.

Having now described my invention, what I claim as new, and desire to obtain by Letters Patent, is—

1. In a fluid-pressure brake, the combination with means for regulating the pressure with which the brakes are applied, of a speed-controlled device and a variable intermediate element acting on said regulating means, whereby the braking force may be varied in accordance with the speed of the car, or any desired function thereof.

2. In a fluid-pressure brake, the combination with a valve for regulating the brake-cylinder pressure, of a speed-controlled device and a variable intermediate element for varying the effect of the said speed-controlled device upon the valve.

3. In a fluid-pressure brake, the combination with a valve for regulating the brake-cylinder pressure, and a load device acting on said valve, of a speed-controlled mechanism operating to vary the effect of the load device upon the valve.

4. In a fluid-pressure brake, the combination with an exhaust-valve for regulating the brake-cylinder pressure, of a speed-controlled device and a variable intermediate element operated by said speed-controlled device for varying the effect of the speed-controlled device upon the valve.

5. In a fluid-pressure brake, the combination with an exhaust-valve for regulating the pressure in the brake-cylinder, and a load device acting on said valve, of a speed-controlled mechanism and a variable intermediate element connected to said speed-controlled mechanism and bearing on said load device.

6. In a fluid-pressure brake, the combination with an escape-valve for regulating the pressure in the brake-cylinder of a speed-controlled device and a cam-surface actuated by said speed-controlled device for holding the valve closed.

7. In a fluid-pressure brake, the combination with an escape-valve for regulating the brake-cylinder pressure and a load device acting on said valve, of a speed-governor and a cam-surface governed thereby for varying the effect of the load device on the valve.

In testimony whereof I have hereunto set my hand.

ALBERT KAPTEYN.

Witnesses:
   EMIL VOLT,
   F. BOSSHAROTTE.